(12) United States Patent
Lasko-Harvill et al.

(10) Patent No.: US 6,452,574 B1
(45) Date of Patent: Sep. 17, 2002

(54) HOOD-SHAPED SUPPORT FRAME FOR A LOW COST VIRTUAL REALITY SYSTEM

(75) Inventors: Ann Lasko-Harvill, San Mateo; Michael Teitel, Portola Valley; Jaron Z Lanier, Palo Alto, all of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/665,429

(22) Filed: Sep. 19, 2000

Related U.S. Application Data (63) Continuation of application No. 09/118,734, filed on Jul. 17, 1998, now Pat. No. 6,124,838, which is a continuation of application No. 08/319,026, filed on Oct. 6, 1994, now Pat. No. 5,850,201, which is a continuation of application No. 08/165,045, filed on Oct. 6, 1993, now abandoned, which is a continuation of application No. 07/888,472, filed on May 21, 1992, now abandoned, which is a continuation of application No. 07/621,127, filed on Nov. 30, 1990, now abandoned.

(51) Int. Cl.[7] .................................................. G09G 5/00
(52) U.S. Cl. ...................................... 345/8; 340/825.19
(58) Field of Search ............................... 345/8, 7, 163; 348/77, 121, 142, 699; 34/207, 464 R; 340/407.1, 825.19; 128/782; 434/22, 46, 55, 57; 352/39

(56) References Cited

U.S. PATENT DOCUMENTS

| | | |
|---|---|---|
| 3,749,810 A | 7/1973 | Dow |
| 3,777,305 A | 12/1973 | Stoutmeyer |
| 4,048,653 A | 9/1977 | Spooner |
| 4,048,658 A | 9/1977 | Spooner |
| 4,293,855 A | 10/1981 | Perkins |
| 4,446,480 A | 5/1984 | Breglia et al. |
| 4,461,553 A | 7/1984 | Doerr et al. |
| 4,484,179 A | 11/1984 | Kasday |
| 4,682,159 A | 7/1987 | Davison |
| 4,688,037 A | 8/1987 | Krieg |
| 4,713,651 A | 12/1987 | Morag |
| 4,807,202 A * | 2/1989 | Cherri et al. ................ 367/129 |
| 4,817,633 A | 4/1989 | McStravick et al. |
| 4,925,189 A | 5/1990 | Braeunig |
| 4,930,888 A | 6/1990 | Freisleben et al. |
| 4,956,794 A | 9/1990 | Zeevi et al. |
| 5,086,404 A | 2/1992 | Claussen |
| 5,181,181 A | 1/1993 | Glynn |
| 5,513,649 A | 5/1996 | Gevins et al. |

OTHER PUBLICATIONS

"Virtual Environment Display System" S. S. Fisher, M.McGreevy, J.Humphries, W.Robinett, Oct. 23–24, 1986, pp 3–13.*

Coneau, "Headsight Television System Provides Remote Surveillance," Nov. 1961, pp. 86–90.

Sutherland, "A head–mounted three dimensional display," 1968, pp. 757–763.

\* cited by examiner

*Primary Examiner*—Amare Mengistu
(74) *Attorney, Agent, or Firm*—Conley, Rose & Tayon, PC; B. Noël Kivlin (57) ABSTRACT

Apparatus is disclosed for viewing computer generated images and for tracking the positions of the user's head and hand. One alternative of the apparatus includes a frame element, versatilely mountable, with sensors for the head tracking of a user whose bodily movement is constrained to a small area. Short range and inexpensive sensors are deployed for tracking the position of the user's head; these sensors are deployed partly on a on the user's head and partly on the tracking frame. All the electronics for tracking and user input are enclosed in a mobile pack. In another alternative of the tracking invention natural forces such as gravity, the Earth's magnetic field, and inertia are used, so additional references. The display allows for interchangeable optical elements so that it may be tailored to suit the needs of a particular user or application. One optical element disclosed is a bicolor polarizer, which allows an lcd to inexpensively provide a bicolor display without loss of resolution.

19 Claims, 7 Drawing Sheets

Another embodiment:
headtracking sensing elements arrayed on adjustable arms, on stand

HOOD-SHAPED SUPPORT FRAME FOR A LOW COST VIRTUAL REALITY SYSTEM

This application is a continuation of co-pending U.S. application Ser. No. 09/118,734, filed Jul. 17, 1998, now U.S. Pat. No. 6,124,838 which is a continuation of Ser. No. 08/319,026, filed Oct. 6, 1994, now U.S. Pat. No. 5,850,201, which is a continuation of abandoned U.S. application Ser. No. 08/165,045, filed Oct. 6, 1993, which is a continuation of abandoned U.S. application Ser. No. 07/888,472, filed May 21, 1992, which is a continuation of abandoned U.S. application Ser. No. 07/621,127, filed Nov. 30, 1990.

BACKGROUND OF THE INVENTION

The present invention relates generally to the field of devices for data entry, viewing, and manipulation in computers. More particularly, this invention relates to a low cost human interface system for interactive computer simulations, most particularly a low cast human interface for a virtual reality system.

Three of the key aspects of a virtual reality interface are tracking the user's head and other body parts, sensing user input actions and display of sensory information to the user in such a way that the sensory information displayed replaces the corresponding senses arising from the physical world. Such systems are typically quite expensive.

Position and orientation of the user's head and other body parts are continually tracked in order to keep the simulation updated to correspond correctly to the user's changing point of view. Tracking technologies have been relatively high cost components of a virtual reality system, and typically involve electromagnetic transmitter/receiver systems such as manufactured by Polhemus Inc., of Colchester, Vt.

The display of sensory information from the virtual reality simulation must be proximal to the user's head at all times, so that the relative position of the display to the user's eyes and ears remains constant as the user moves. Such a system is generally termed a Head Mounted Display (HMD), though it is not limited to devices mounted directly on the head. It contains visual and auditory displays for each sense organ and has typically also been an expensive component.

Of particular interest here is the visual display portion of the HMD. Weight concerns generally dictate a liquid crystal display (lcd). The general structure of a lcd display includes a source of unpolarized light, a first polarizer, a polarization rotating array (which creates the individual pixels), and a second polarizer which serves as an analyzer. Light travels in the above named sequence. The first polarizer gives the light a uniform polarization, either in the angle transmitted by the analyzer or perpendicular to it. The polarization rotating array operates on the polarized light in a pixel-wise manner, either passing it unchanged or rotating the polarization by 90°. This light then continues on to the analyzer, which in one polarization angle transmits all wavelengths, and perpendicular to that blocks all wavelengths, to leave light and dark pixels for display. Since in an HMD the pixels are so close to the viewer's eye, many people focus on the pixels at an individual level and don't perceive the overall shapes within the image as well. For this reason a diffusion screen may be superimposed over the lcd, which slightly blurs the image and fine detail, but facilitates the perception of patterns and shapes. Understandably, not all viewers like this trade off.

Color lcds can be made by including a mask within the display, dyed with red, blue and green pixel sized dots. This mask is lined up-with the pixels of the polarization rotating array, and each grouping of three monochromatic pixels masked to form a red, blue and green pixel then forms a color pixel. This conversion to a color lcd obviously results in a 3:1 reduction in resolution.

Color versus resolution is just one of the many tradeoffs that must be resolved in choosing a display. Another important consideration is whether and how much the fields of view of the right and left eyes overlap. The most natural classification is into two groups—separate images for each eye and totally shared images. Using separate images for each eye instead of a totally shared image has the advantage of allowing stereoscopic vision and improved depth perception. Unfortunately, having two separate images requires more computing power, and for an lcd of given pixel size and distance from the eye only half as many pixels are available for each image, resulting again in lower resolution.

SUMMARY OF THE INVENTION

The present invention provides an apparatus and method for viewing computer generated images with a variety of display characteristics easily modifiable and with a high resolution bicolor lcd available, and for inexpensively tracking the positions of the user's head and hand.

The tracking invention in one alternative includes a frame element for the head tracking of a user whose bodily movement is constrained to a small area. In a particular embodiment the tracking frame is mountable on a chair, in which the user would sit. Short range and inexpensive tracking elements are deployed for tracking the position of the user's head; these tracking elements are deployed partly on the user's head and partly on the tracking frame. The electronics for tracking and user input are enclosed in a mobile pack, placed near the user or affixed to the chair. In another particular embodiment, some of the hand tracking elements are located near the head, and hand tracking is referenced from the head. This limits the range of hand tracking to an arm's length radius, which further simplifies the electronics and processing involved. In yet another alternative of the tracking invention sensors are employed which use natural forces such as gravity, the Earth's magnetic field, and inertia as their reference, so additional references are unnecessary. In a particular embodiment of the invention directed to the display, the head mounted display allows for interchangeable optical elements so that the display characteristics may be tailored to suit the needs of a particular user or application. One optical element disclosed is a bicolor polarizer which allows an lcd to inexpensively provide a bicolor display without loss of resolution.

DETAILED DESCRIPTION OF THE SPECIFIC EMBODIMENTS

Figure 1:
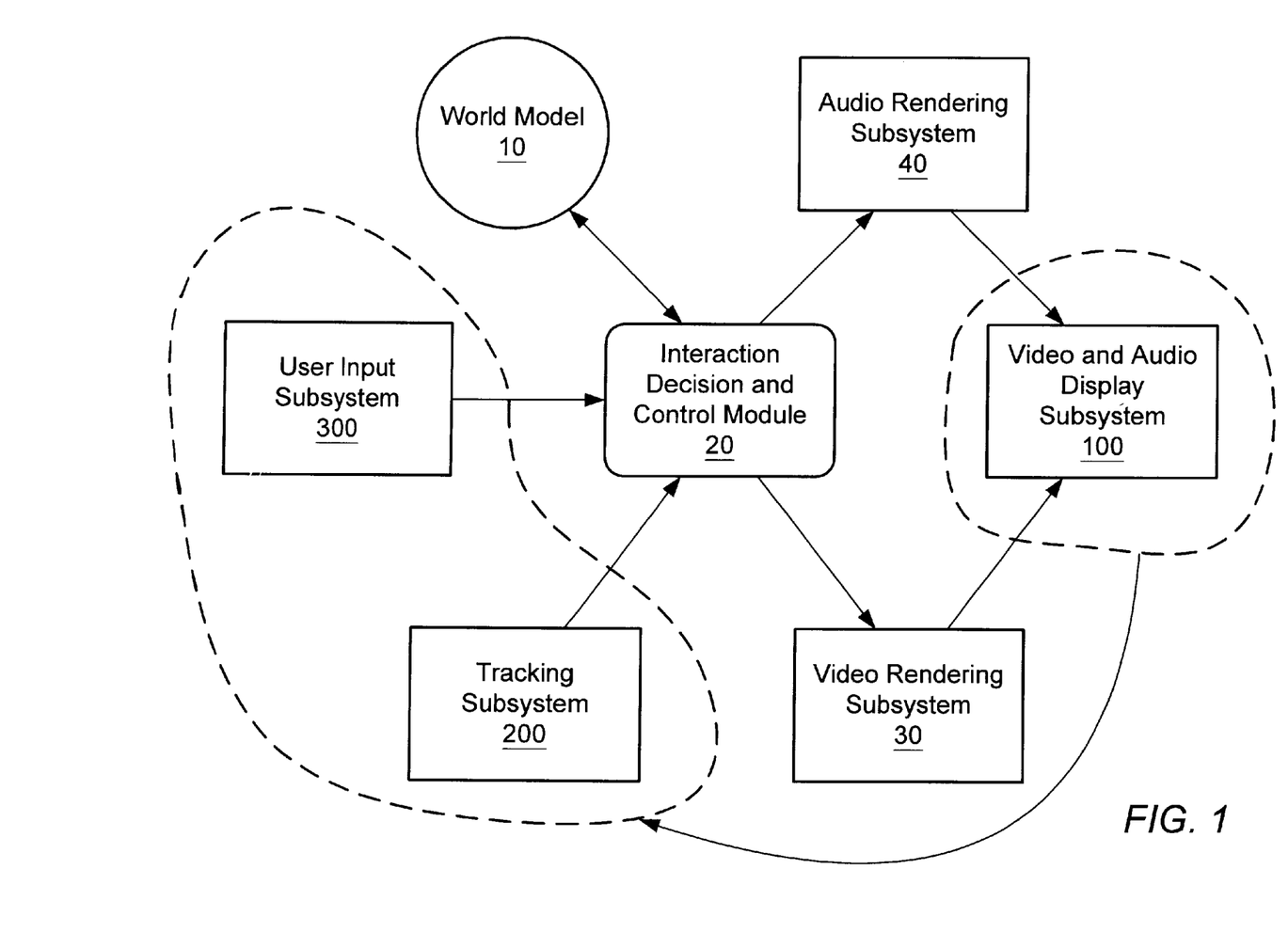
FIG. 1 is a block diagram of a particular embodiment of a virtual reality system.

FIG. 1 is a block diagram of a virtual reality system, and FIGS. 2 through 5 of the drawings depict various particular embodiments of the present invention for purposes of illustration only. One skilled in the art will recognize from the following discussion that alternative embodiments of the structures and methods illustrated herein may be employed without departing from the invention.

Reference to FIG. 1 is helpful for an understanding of the present invention. World Model 10, information which is stored in a storage device such as magnetic disk or an interchangeable ROM cartridge, is linked to the Interaction Decision and Control Module (IDCM) 20, which includes a host computer and appropriate software. IDCM 20 in turn is linked to the Video Rendering Subsystem 30 and Audio Rendering Subsystem 40, which typically comprise special coprocessors. These two rendering subsystems 30 and 40 are also linked to the Video and Audio Display Subsystem (VADS) 100, which generally includes a Head Mounted Display (HMD) and appropriate drivers. The visual display portion of the HMD is usually an lcd; but in some particular embodiments is a liquid crystal shuttered (LCS) crt (LCSs are available from Tektronix, Inc. of Beaverton, Oreg.), and in alternative particular embodiments is a Private Eye (available from Reflection Technology, Waltham Mass.). Tracking Subsystem (TS) 200 and User Input Subsystem (UIS) 300 are closely related and both provide information to IDCM 20: TS 200 is responsible for tracking the position and/or orientation of the user's head and other body parts, whereas UIS 300 is responsible for more conscious forms of input from the user, such as through DataGloves, DataVests, DataSuits, or a variety of other devices including eye tracking devices, voice recognition devices, video tracking devices, keyboards and other conventional data entry devices, pneumatic devices (oral sip and puff), facial expression sensors (optical, fiberoptic, electromyometric), sensors for biological data such as temperature, heart rate or blood pressure, joysticks, pressure sensitive floormats, etc. One example of a virtual reality system can be found in U.S. patent application Ser. No. 535,253 filed Jun. 7, 1990 entitled Virtual Reality Network incorporated herein by reference.

Figure 2:
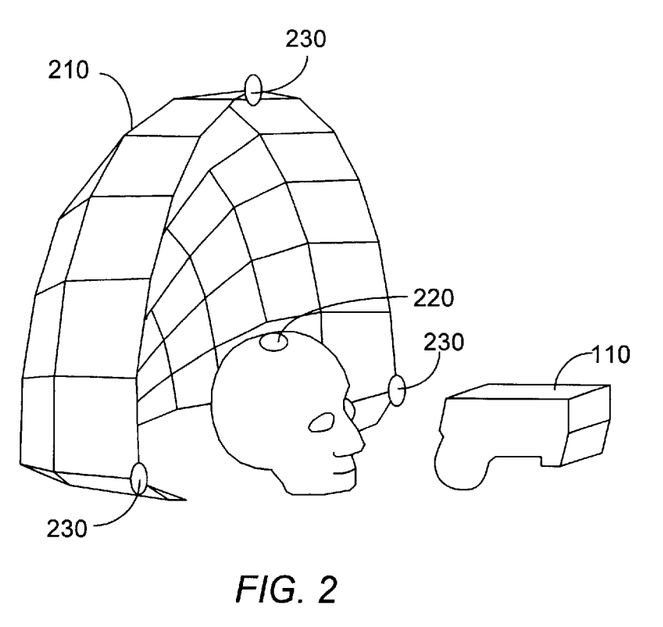
FIG. 2 is a side perspective view of a particular embodiment of a tracking hood according to the present invention.

In a particular embodiment of the present invention as directed to tracking, VADS 100, TS 200 and UIS 300 are closely linked physically, so a dotted line has been drawn around them in FIG. 1. FIG. 2 illustrates a key feature of TS 200 in this embodiment, which is a tracking frame formed as hood 210. Tracking hood 210 is shaped to partially surround the user's head, and it may be used to limit the freedom of movement of the user's head so that shorter range tracking sensors may be used. Position tracking elements are disposed on the hood and on the user's head. The particular embodiment shown in FIG. 2 employs transmitter 220 and receivers 230 and tracking is performed as described in U.S. patent application Ser. No. 317,107, entitled Computer Data Entry and Manipulation Apparatus, incorporated herein by reference and commonly owned. The close proximity of the position tracking elements on the frame to the position tracking elements on the head allow the use of any variety of optical, infrared, or ultrasonic short range inexpensive sensors known to those skilled in the art. In embodiments where HMD 110 is strapped to the user's head, the tracking elements disposed on the head are preferably incorporated into the HMD. In an alternative embodiment the head tracking is done through spring loaded strings on pulleys disposed on the frame and attachable to a mounting on the user's head. Potentiometers or shaft encoders within the pulleys then accurately and inexpensively track the head's movements. In a particular embodiment of the present invention directed to the hand tracking system, such is achieved through similar spring loaded string pulleys incorporated into the head tracking frame, which further simplifies the tracking and input process.

Figure 4:
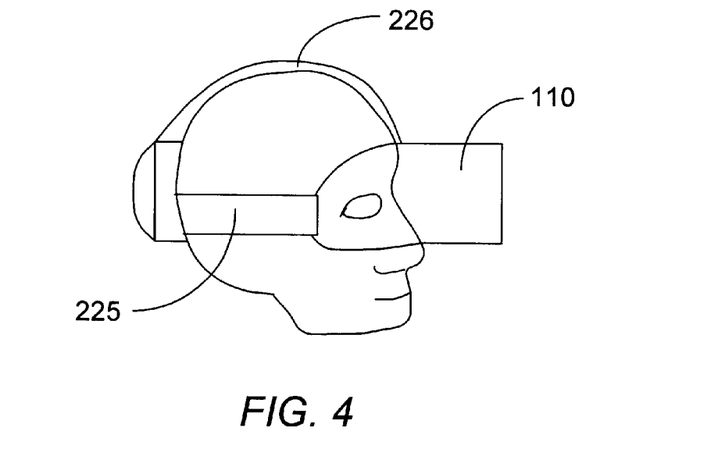
FIG. 4 illustrates a particular embodiment of the Head Mounted Display with bar coding for optical tracking of the head's yaw and pitch.

FIG. 4 illustrates another embodiment of the head tracking system, where a counterbalanced HMD 110 includes bar coded strips 225 and 226 which are read by optical sensors on the tracking hood for measuring the head's pitch (rotation about the left-right horizontal axis) and yaw (rotation about a vertical axis). Limiting tracking to the head's pitch and yaw allows the use of very inexpensive sensors and greatly simplified software. In an embodiment with even cheaper graphics the user's virtual viewpoint is kept eye-level with the horizon and objects are arranged to straddle the horizon. Only the head's yaw is tracked, so relatively few views of the object may be perceived. Only image scaling and block image transferring (blitting) are necessary, resulting in graphics that can be handled by an inexpensive processor.

Figure 7A:
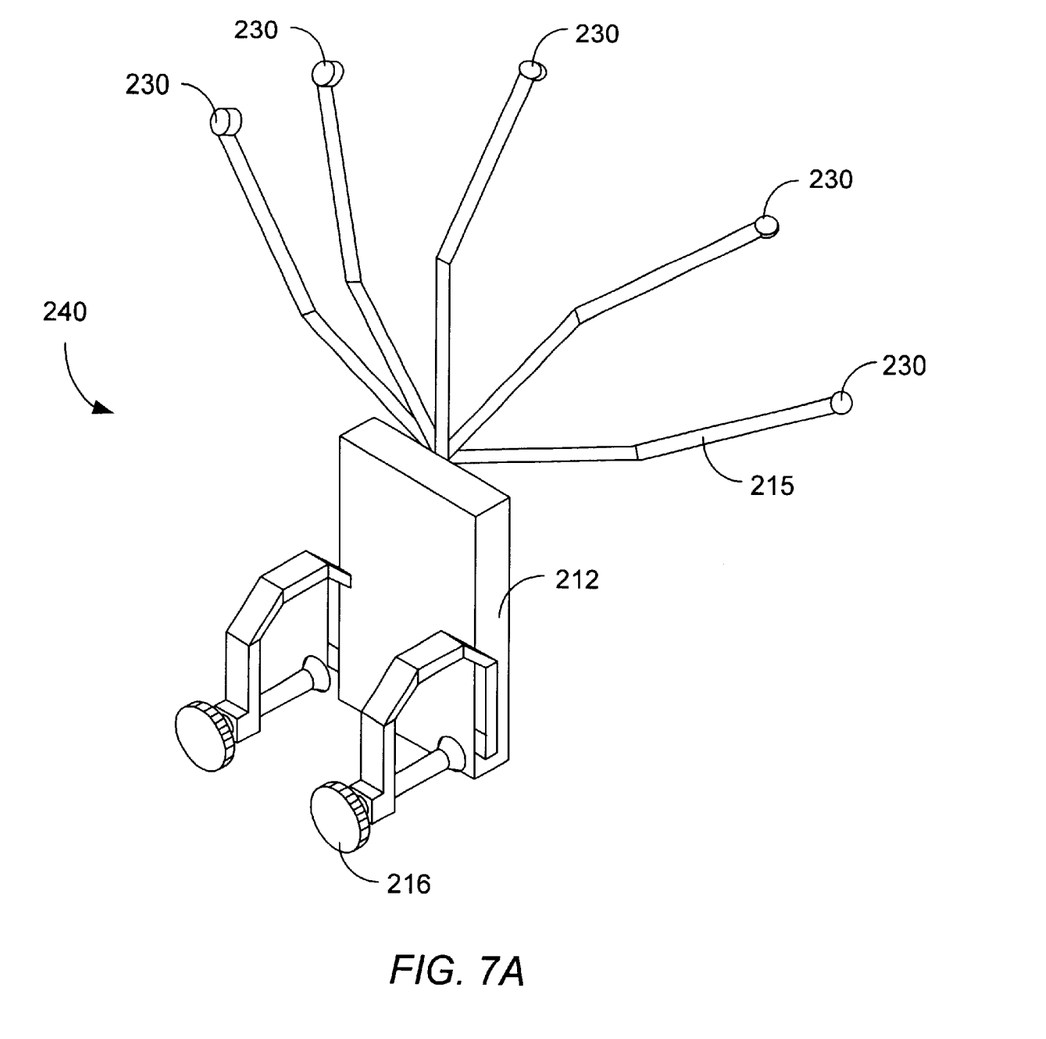
FIGS. 7a and 7b are particular embodiments of the tracking frame.
Figure 7B:
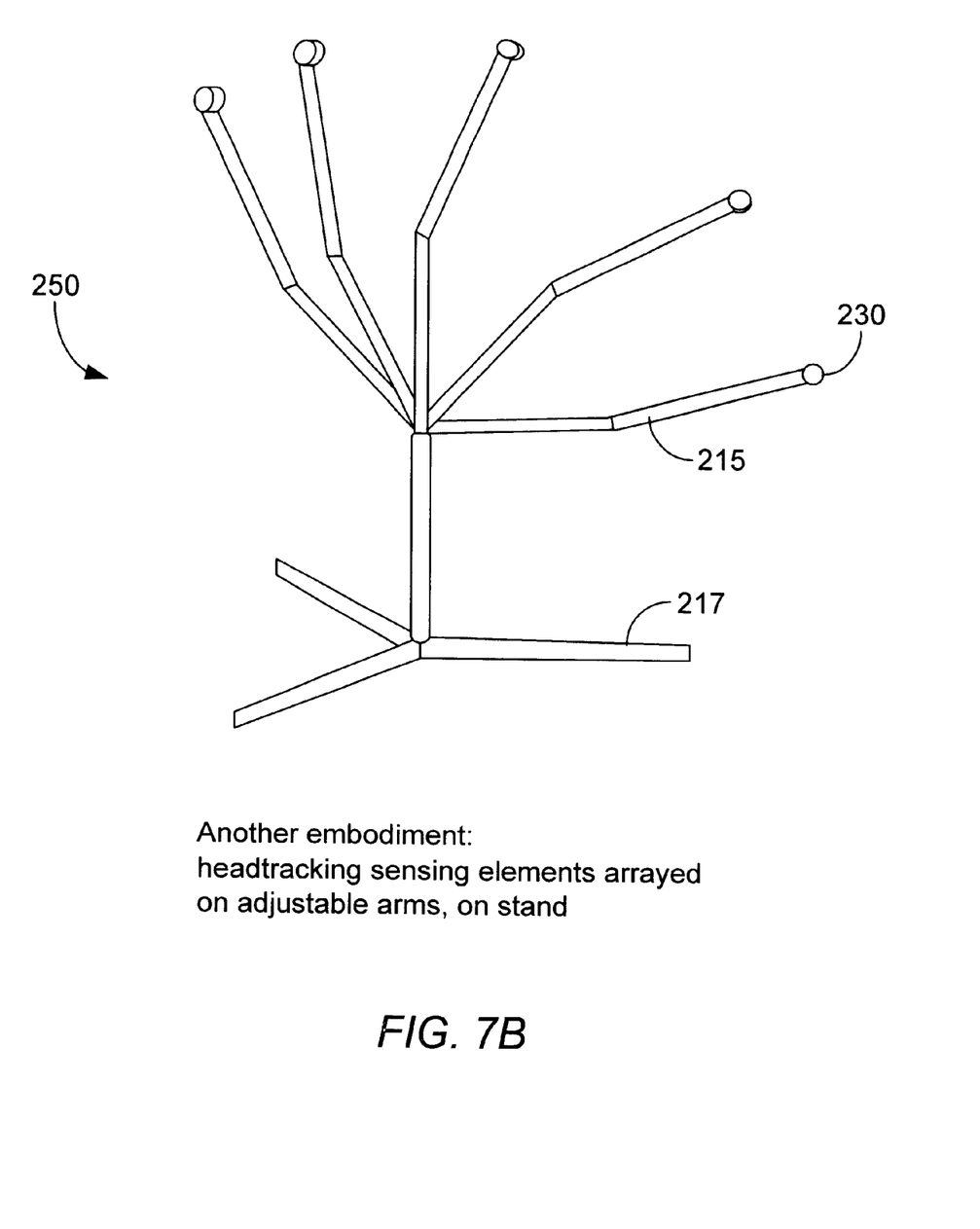
Figure 8:
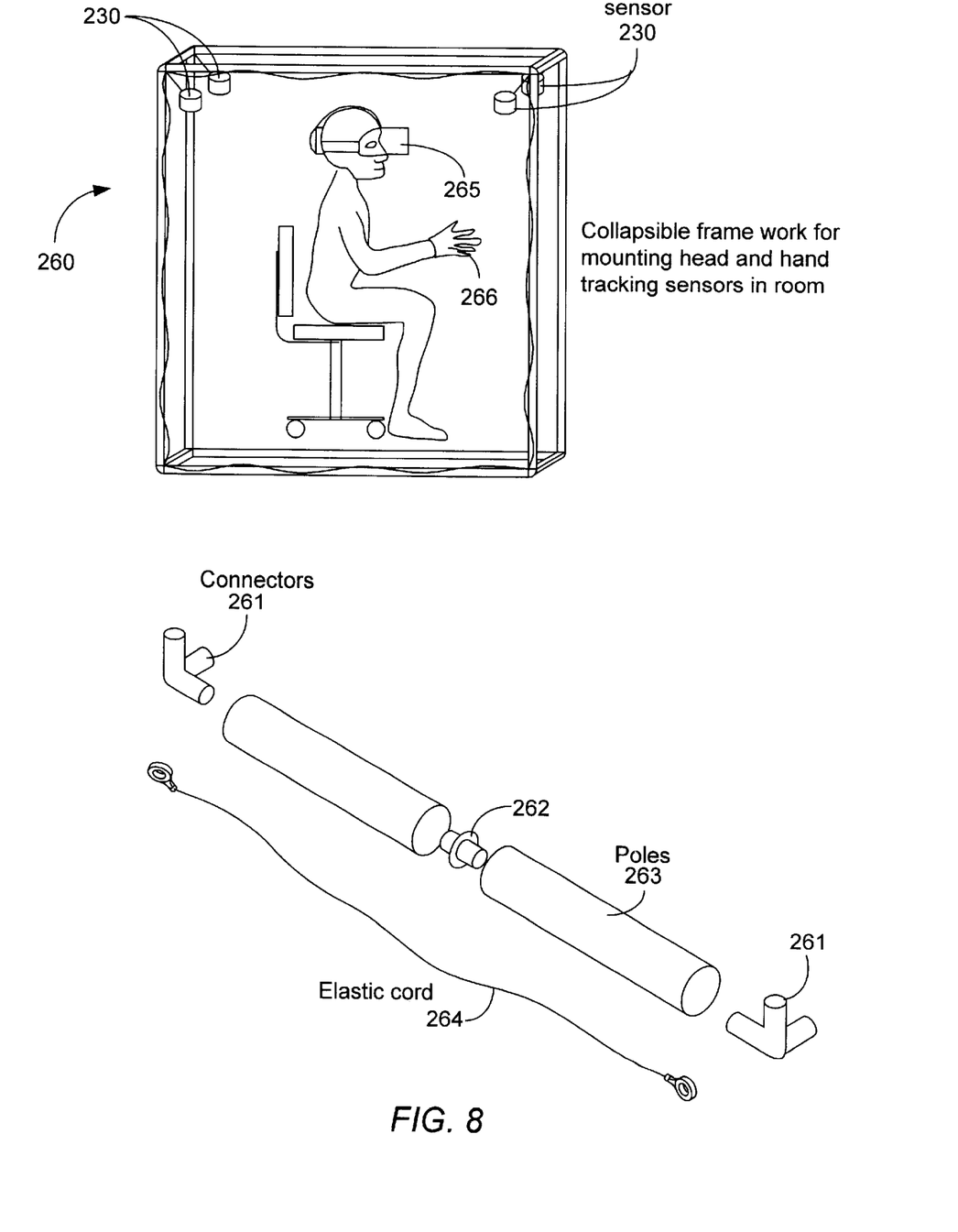
FIG. 8 is an alternative embodiment of the tracking frame.

Further alternative embodiments are shown in FIGS. 7a, 7b and 8. FIG. 7a shows frame 240 with support members 216, sensors 230, backing 212, and clamps 216. FIG. 7b shows frame 250, similar in design but with stand 217 for resting on a desk or similar structure. FIG. 8 shows portable frame 260, which dismantles into hollow rods 263, connectors 261, 262, and elastic retaining cords 264. Sensors 230 respond to head tracking transmitter 265 and hand tracking transmitter 266.

Other alternative embodiments of the head tracking system do not require a tracking frame, but instead use natural forces present in the world as references. The sensors for these embodiments are disposed on the person's head. One such alternative embodiment employs tilt sensors (available from Technical Designs, Inc. of Seattle, Wash.), which use gravity as a reference and provides the head's yaw and pitch. Another alternative embodiment employs electronic compasses and provides the head's yaw. Yet another alternative embodiment employs accelerometers and with appropriate software provides the head's x, y and z coordinates relative to the starting position, as well as yaw, pitch and roll. A particular embodiment of the invention directed to yaw-only tracking (for blit graphics), as mentioned above, employs an electronic compass for head yaw tracking. Another particular embodiment of the present invention as directed to hand tracking systems employs accelerometers on a glove for hand tracking.

Figure 3A:
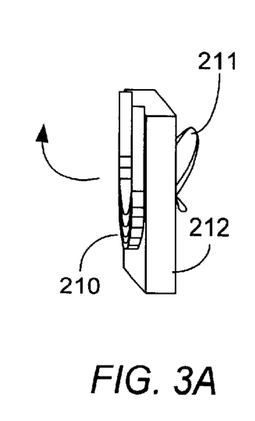
FIGS. 3a, 3b and 3c illustrate a particular embodiment of a collapsible tracking hood according to the present invention.
Figure 3B:
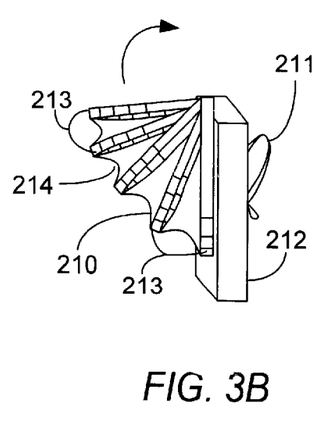
Figure 3C:
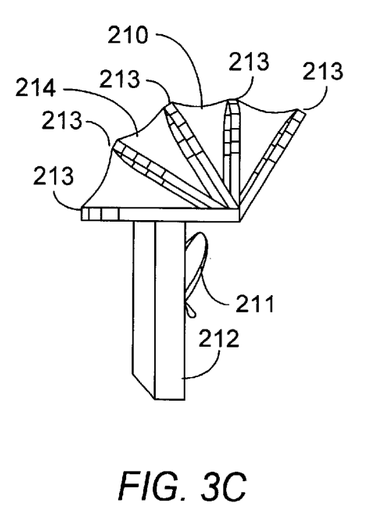

FIGS. 3a, 3b and 3c illustrate a particular embodiment of the head tracking system: collapsible tracking hood 210, with clasps 211 suitable for mounting onto a chair, and support frame 212. Arcuit members 213 are covered by sheath 214 and pivot at a common point so they may collapse together. Sheath 214 is opaque to reduce ambient light which might interfere with optical head tracking systems. For different mounting purposes, different clasps can be used instead of those shown.

Figure 5:
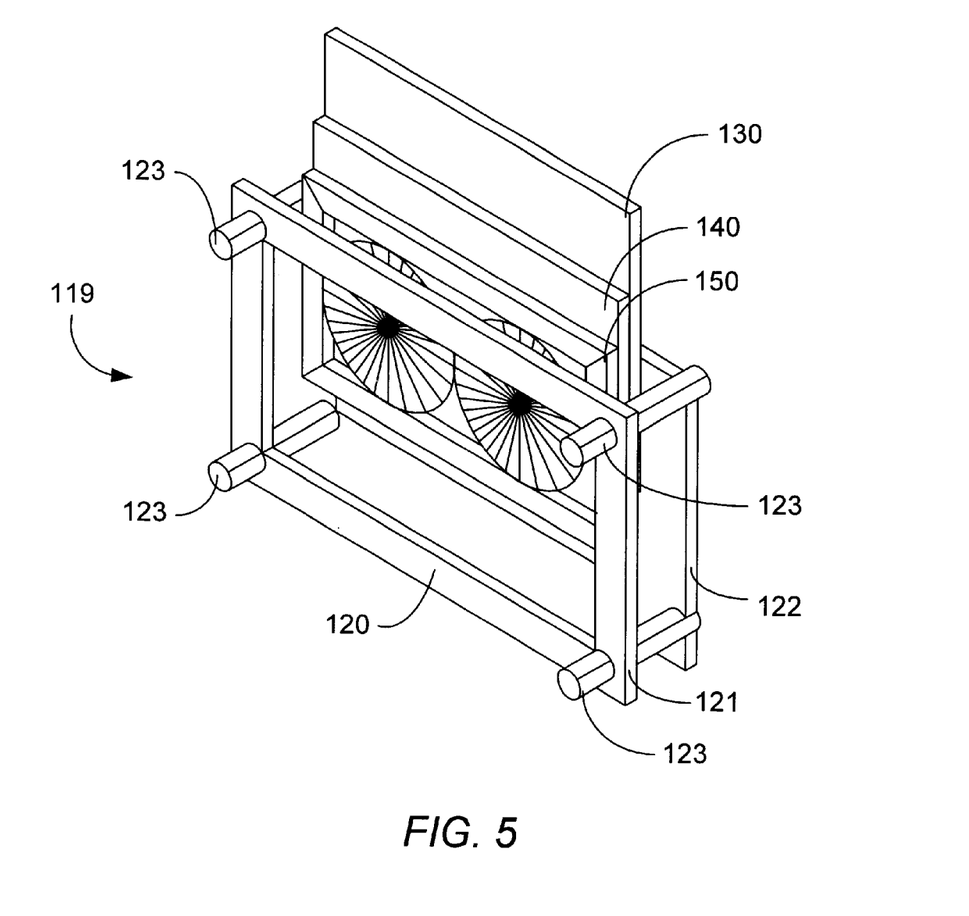
FIG. 5 is a spring loaded frame with interchangeable optical elements for use in an HMD.

An embodiment of the invention directed to the display involves the HMD and is illustrated as display element 119 in FIG. 5. FIG. 5 shows frame 120, which is part of the HMD and is positioned between the lcd and the user's line of sight. Expandable frame 120 holds various optical elements which may be interchanged; it includes front retaining bezel 121 towards the user's eyes and rear retaining bezel 122 towards the lcd elements, connected by spring loaded connectors 123 so that it may expand to accommodate the selected optic elements. Element 130 replaces the analyzer of the lcd and is an interchangeable polarizer; it may be a normal monochrome analyzer, a color masked analyzer, or a bicolor analyzer as described below, whichever better suits the user or virtual environment. Interchangeable filter 140 may be a diffusion screen or other optical element desired by the user. Interchangeable lens 150 allows modification from application to application of whether both eyes have separate images or share the same one. The selection of lens 150 also determines the angle which the image subtends on the user's eye, allowing adjustment of the angular resolution versus the angular field of view. In a particular embodiment of this invention the interchangeable optical elements are coded so that IDCM 20 and VADS 100 may automatically account for the selected display characteristics.

Figure 6:
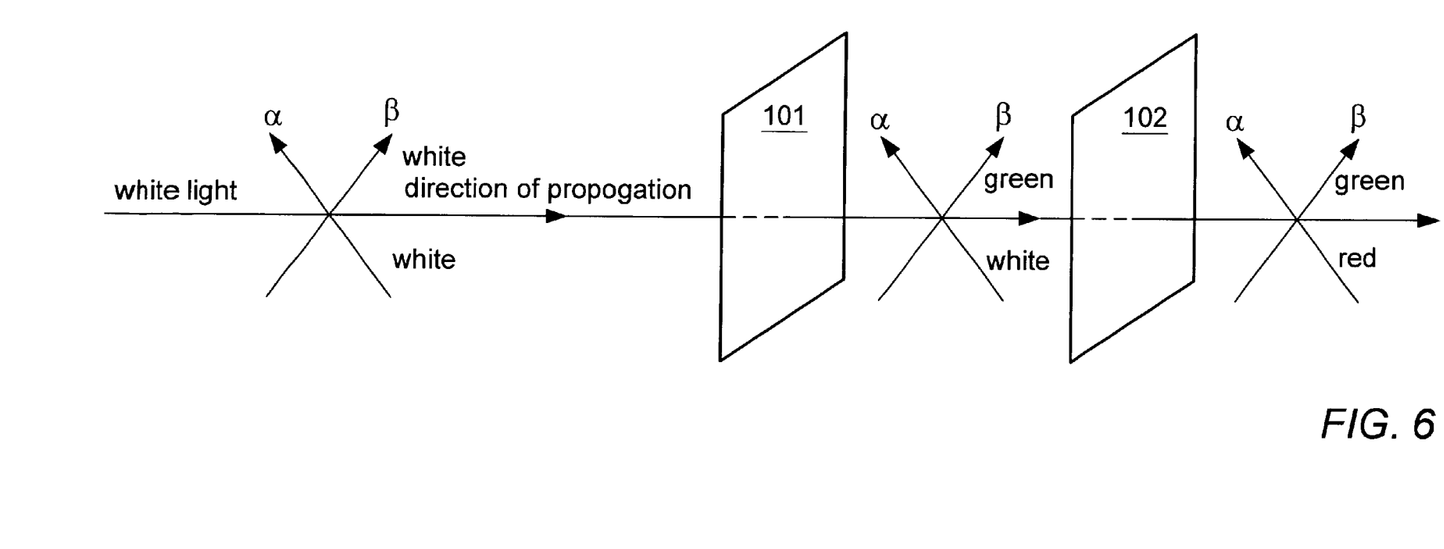
FIG. 6 illustrates the effect of a bicolor polarizer on light.

In a particular embodiment of the present invention directed to a multicolored display, an lcd is used wherein the second polarizer is a bicolor polarizer. Alternatively, the first polarizer may be a bicolor polarizer and the second polarizer a normal polarizer. A bicolor polarizer is made of two colored polarizing swatches, each of which transmits all wavelengths in one polarization angle but only one wavelength, or a limited range of wavelengths, perpendicular to that (such polarizers are available in a variety of colors from Sanritsu Electric Co., Habashi-Ku, Tokyo, Japan). These two swatches are placed with their selective transmission axes perpendicular to each other, so that at one polarization angle light of one frequency is transmitted and at a second polarization angle perpendicular to the first, light of a second frequency is transmitted. FIG. 6 illustrates this operation: incoming white light has components in the $\alpha$ direction (angle), and in the $\beta$ direction (angle). Colored polarizer 101 passes all light in the $\alpha$ direction, but blocks everything but green light in the $\beta$ direction. This light continues to colored polarizer 102 which passes everything in the $\beta$ direction and blocks everything but red in the $\alpha$ direction. The resulting light has only red light in the $\alpha$ direction (angle), and only green light in the $\beta$ direction (angle). Used as one of the polarizers of an lcd, this results in a red against green display.

In an embodiment of the present invention directed to tracking, the close interaction between the VADS 100, TS 200 and UIS 300 is aided by placing all electronics for these subsystems in a mobile unit which may be placed near the tracking hood and connected to it by cable. This close placement increases speed of operation and reduces noise. Unitized enclosure allows cost reduction through shared electronics. In a particular embodiment this mobile unit is housed within a backpack upon which the tracking hood is mountable.

The foregoing is the description of particular embodiments of the invention. It should be understood that specific details, such as component types, have been provided to explain the construction of the invention. The scope of the invention may be determined from the appended claims.

What is claimed is:

1. A frame for use in a system to determine a position of a person, the frame comprising:

a plurality of tracking elements;

a hood-shaped support system for supporting the plurality of tracking elements, wherein the hood-shaped support system at least partially surrounds the person's head;

wherein the plurality of tracking elements are usable to track a position of at least one component of an orientation of the person's head relative to the hood-shaped support system; and a plurality of adjustable arms.

2. A frame according to claim 1, further comprising a stand for holding the hood shaped support system.

3. A frame according to claim 2, wherein the stand includes three legs.

4. A frame according to claim 2, wherein the stand is for resting on a table.

5. A frame according to claim 1, further comprising a clamping system, connected to the hood shaped support system, for clamping the hood shaped support system to a chair.

6. A frame according to claim 5, wherein the clamping system includes two clamps for clamping to the chair.

7. A frame according to claim 1, further comprising means for determining a position of the person using the plurality of tracking elements.

8. A frame according to claim 1, wherein the tracking elements are sensors and a transmitter is mounted to the person's head.

9. A frame for use in a system to determine a position of a person, the frame comprising:

a plurality of tracking elements;

a hood-shaped support system for supporting the plurality of tracking elements, wherein the hood-shaped support system at least partially surrounds the person's head; and a stand for holding the hood shaped support system;

wherein the plurality of tracking elements are usable to track a position of at least one component of an orientation of the person's head relative to the hood-shaped support system.

10. The frame as recited in claim 9, wherein the stand includes three legs.

11. The frame as recited in claim 9, wherein the stand is for resting on a table.

12. The frame as recited in claim 9, further comprising a clamping system, connected to the hood-shaped support system, for clamping the hood shaped support system to a chair.

13. The frame as recited in claim 12, wherein the clamping system includes two clamps for clamping to the chair.

14. The frame as recited in claim 9, further comprising means for determining a position of the person using the plurality of tracking elements.

15. The frame as recited in claim 9, wherein the tracking elements are sensors and a transmitter is mounted to the person's head.

16. A frame for use in a system to determine a position of a person, the frame comprising:

a plurality of tracking elements;

a hood-shaped support system for supporting the plurality of tracking elements, wherein the hood-shaped support system at least partially surrounds the person's head; and a clamping system, connected to the hood-shaped support system, for clamping the hood-shaped support system to a chair;

wherein the plurality of tracking elements are usable to track a position of at least one component of an orientation of the person's head relative to the hood-shaped support system.

17. The frame as recited in claim 16, wherein the clamping system includes two clamps for clamping to the chair.

18. The frame as recited in claim 16, further comprising means for determining a position of the person using the plurality of tracking elements.

19. The frame as recited in claim 16, wherein the tracking elements are sensors and a transmitter is mounted to the person's head.

* * * * *